(12) United States Patent
Kishi

(10) Patent No.: US 6,235,861 B1
(45) Date of Patent: May 22, 2001

(54) ADDITION-CURING ORGANOPOLYSILOXANE COMPOSITION

(75) Inventor: Katsuhiko Kishi, Hachioji (JP)

(73) Assignee: Three Bond, Tokyo (JP)

( * ) Notice: Subject to any disclaimer, the term of this patent is extended or adjusted under 35 U.S.C. 154(b) by 0 days.

(21) Appl. No.: 09/331,142

(22) PCT Filed: Dec. 19, 1997

(86) PCT No.: PCT/JP97/04729

§ 371 Date: Jun. 16, 1999

§ 102(e) Date: Jun. 16, 1999

(87) PCT Pub. No.: WO98/28366

PCT Pub. Date: Jul. 2, 1998

(30) Foreign Application Priority Data

Dec. 20, 1996 (JP) ..................................................... 8-341103
Dec. 20, 1996 (JP) ..................................................... 8-341104
Jun. 30, 1997 (JP) ..................................................... 9-209574

(51) Int. Cl.$^7$ ............................ C08G 77/06; C08G 77/08
(52) U.S. Cl. ................................ 528/12; 528/15; 528/20; 528/21; 528/23; 528/31; 528/32; 528/33
(58) Field of Search .................................. 528/12, 15, 20, 528/21, 23, 31, 32, 33

(56) References Cited

U.S. PATENT DOCUMENTS

| | | | | |
|---|---|---|---|---|
| 5,548,006 | * | 8/1996 | Hirabayashi et al. | 524/82 |
| 5,977,249 | * | 11/1999 | Kovar et al. | 524/723 |
| 5,998,548 | * | 12/1999 | Brennenstuhl et al. | 525/331.9 |
| 6,010,646 | * | 1/2000 | Schleifstein | 252/500 |

FOREIGN PATENT DOCUMENTS 7-292255   11/1995   (JP).

* cited by examiner

Primary Examiner—Robert Dawson
Assistant Examiner—Jeffrey B. Robertson
(74) Attorney, Agent, or Firm—Dilworth & Barrese, LLP

(57) ABSTRACT

An addition-curing organopolysiloxane composition which has excellent shelf stability around room temperature, rapidly cures by moderate ultraviolet irradiation or heating, and is suitable for use as the one solution type. A reaction inhibitor is added to the composition comprising an alkenylated organopolysiloxane, an organohydrogenpolysiloxane, and a platinum catalyst. The inhibitor is a thiophene compound, an isocyanide compound, a cyclic thioether compound, a cyclic azo ether compound, an imino compound, or a polymer which has, in the molecule, functional groups each containing one or more sulfur, nitrogen, or phosphorus atoms and has an average molecular weight of 1,000 to 200,000, and which is capable of forming a complex with a platinum atom.

5 Claims, No Drawings

US 6,235,861 B1

ADDITION-CURING ORGANOPOLYSILOXANE COMPOSITION

TECHNICAL FIELD

This invention relates to an organopolysiloxane composition and, more particularly, a heat-curable organopolysiloxane composition of an addition-reaction type which has a good shelf stability around room temperature and is suitable for the one solution type.

BACKGROUND ART

There has been hitherto well-known an addition-curing silicone composition containing as a main component an organopolysiloxane containing an alkenyl group, an organohydrogenpolysiloxane and a platinum catalyst. These compositions can have a higher curing rate and can be cured even in a thicker part as compared with a moisture-curing composition which may be reacted and cured with the moisture in atmosphere, so that it has been applied for the use of potting and the like.

As the catalyst for reacting an organopolysiloxane with an organohydrogenpolysiloxane in the addition-reaction type silicone, there has been usually employed a platinum catalyst as mentioned above. A rapid addition reaction is brought about by admixing the above-mentioned components to form a cured product. Since curing by this addition reaction may be also brought about rapidly by admixing at ambient temperature, there has been usually adopted such a complicated use method wherein the planinum catalyst and the organohydrogenpolysiloxane are packed in separate vessels to form a two-pack solution type and two solutions are admixed when curing of the composition is required. In the two-pack solution type, although it is convenient to apply a mixing coating applicator and the like in admixing two solutions, it is difficult to prevent a mixing chamber or a nozzle from the curing encountered therein, so that the interior of the applicator should be washed whenever applied, which leads to a troublesome handling.

Under these circumstances, it has been presented the problem to be solved by those skilled in the art to obtain an addition-reaction type silicone composition in the one solution type and there has been desired an addition-reaction type silicone composition wherein all components therefor may be stored over a prolonged time in a mixed state and curing may be brought about first when heated. For solving such a problem, there have been proposed many compositions wherein reaction inhibitors are compounded for imparting a shelf stability at room temperature.

As examples of such inhibitors, there are disclosed organic phosphorous compounds in U.S. Pat. No. 3,188,300, benzotriazole compounds in U.S. Pat. No. 3,192,181, sulfoxide compounds in U.S. Pat. No. 3,445,420 and pyridine compounds in U.S. Pat. No. 3,188,299, respectively.

Moreover, Japanese Patent Kokai JP62-20557A discloses the use of monoalkylamine compounds and Japanese Patent Kokai JP3-95267A discloses inhibiting effect by concomitant use of monoalkylamine compounds with acetylenic compounds.

However, all of said reaction inhibitors are extremely difficult to keep compatible curability with stability; in particular, bidentate conformational compounds such as phosphorous compounds or bipyridyl may exhibit a favorable result in stability around room temperature, but they may have a lowered reaction inhibiting effect with lapse of time when coexisted with a platinum catalyst over a prolonged period of time, whereby thickening or gelation would take place. In order to improve a shelf stability over a prolonged period of time, acetylenic compounds have been frequently used, but, if the amount thereof to be added is increased, curability would be lowered.

And further, addition of ethylenediamine as amine-type compounds has presented the problem of an extremely lowered shelf stability though curability could be improved.

In view of the above, there has been proposed in Japanese Patent Kokai JP1-47442A the use of a platinum catalyst coated with a thermoplastic resin, the so-called microcapsule-type platinum catalyst, to attain a shelf stability. The principle of this catalyst resides in that a platinum catalyst is physically coated with a thermoplastic resin and the thermoplastic resin is melted by heating in use to separate the platinum catalyst, whereby the platinum catalyst may effectively act.

According to this method, a shelf stability could be attained, but properties of heat curable resins are still insufficient. In short, a heating temperature or a heating time until an effective action of the platinum catalyst could be achieved may vary depending upon a thickness of a coated film or a polymerization degree in the heat curable resins because of the physical coating. In order to determine exact temperature and time for improving the reproductivity thereof, a considerable precision is required for the manufacturing step of microcapsules. Moreover, since this method uses physical coating, it has the drawback that microcapsules tend to be broken by vigorous stirring or the like during the manufacturing step of silicone compositions.

OBJECT OF INVENTION

It is an object of this invention to provide an addition-reaction type organopolysiloxane composition which does not cause any lowered catalyst effect with lapse of time as observed in a system blending the prior art reaction inhibitor, is excellent in a shelf stability around room temperature and may be rapidly cured by heating.

SUMMARY OF INVENTION

We have made earnest studies to accomplish the above object and, as a result, found out that the above object can be attained by using selected compounds as a reaction inhibitor of a platinum catalyst, upon which this invention has been completed.

More specifically, this invention is directed to an addition-curing type organopolysiloxane composition comprising an organopolysiloxane containing an alkenyl group, an organohydrogenpolysiloxane, a platinum catalyst and a reaction inhibitor, characterized in that said reaction inhibitor is at least one member selected from the group consisting of a thiophene compound, an isocyanide compound, a cyclic thioether compound, a cyclic azoether compound, an imino compound and a polymer of an average molecular weight of 1,000–200,000 which has a plurality of sulfur atom-, nitrogen atom- or phosphorus atom-containing functional groups capable of forming a complex with a platinum atom.

As the organopolysiloxane containing an alkenyl group (Component 1), the organohydrogenpolysiloxane (Compound 2) and the platinum catalyst (Component 3), which may be employed in this invention, there may be appropriately applied those already used and known in the addition-reaction type silicone composition of the prior art.

The component 1, the organopolysiloxane containing an alkenyl group, which may be used in this invention, has an alkenyl group directly attached to a silicon atom and the siloxane skeleton thereof may be either straight or branched, while it may be a mixture of two or more thereof. As the alkenyl group may be mentioned a vinyl group, an allyl group, a 1-butenyl group, a 1-hexenl group, etc. Of these groups, a vinyl group is preferable in view of reactivity or physical properties after curing.

As the substituent attached to a silicon atom other than the alkenyl group may be mentioned an alkyl group such as a methyl group, an ethyl group, a propyl group, a hexyl group or a dodecyl group, a group having an unsaturated bond within the molecule such as a phenyl group or an allyl group, an aralkyl group, a halogen atom, a substituted hydrocarbyl group and the like. The organopolysiloxane may contain a hydroxyl group or an alkoxy group.

The Component 1 may form an addition-reaction type, curable organopolysiloxane-base polymer and it is essential that the alkenyl group is contained at not less than 0.05 mole %, preferably 0.05–0.2 mole %, in all organic groups attached to the silicon atom. And, the polymerization degree or viscosity thereof is not particularly critical, but a viscosity of 10–1000000 centipoises at 25° C. is practically preferred.

The Component 2, the organohydrogenpolysiloxane, is the component which forms a network of a polymer by the addition reaction with the Component 1 to make a cured product in a gummy or gel state and usually has two or more hydrogen atoms attached to a silicon atom per molecule. And, the positions of the silicon atom or the hydrogen atoms directly attached thereto are not particularly critical, provided that they are in the siloxane skeleton and may be in the side chain of the molecular end or the main chain skeleton.

The organic group directly attached to the silicon atom other than hydrogen atom may be exemplified by an alkyl group such as a methyl group, and ethyl group, a propyl group, a hexyl group or a dodecyl group, a group having an unsaturated bond within the molecule such as a phenyl group or an allyl group, an aralkyl group, a halogen atom, a substituted hydrocarbyl group and the like. Moreover, such an organohydrogenpolysiloxane may be of a straight, branched, cyclic, network or three-dimentional structure, or in a mixture of two or more thereof.

And, the polymerization degree or viscosity thereof is not particularly critical, but a viscosity of 1–100000 centipoises is practically preferred. The amount of the Component 2 to be blended is such an amount so as to be 0.2–5 hydrogen atoms directly attached to the silicon atom in the Component 2 per alkenyl group in the Component 1.

The Component 3 is a catalyst for bridging the Components 1 and 2 according to hydrosilylation reaction which usually comprises an organic metal complex with a platinum atom. As the hydrosilylation catalyst, there may be used any of suitable platinum catalysts well-known in the prior art. As examples thereof may be mentioned chloroplatinic acid, alcohol-modified chloroplatinic acid, a complex of platinum with a ketone, a complex of platinum with a vinylsiloxane and the like, and inter alia, there may be preferably mentioned a platinum-hydrocarbon complex disclosed in U.S. Pat. No. 3,159,601 to Ashiby, a platinum-alcoholate complex disclosed in U.S. Pat. No. 3,220,970 to Ramorou, a platinum-olefin complex disclosed in U.S. Pat. No. 3,516, 946 to Carstett and a catalyst disclosed by Speier ("Advanced Organic Chemistry", Vol. 17, page 407, 1979). The amount of the platinum catalyst to be blended in this invention is usually 10–100 ppm, preferably 30–70 ppm, on the weight basis of the heat-curable organosiloxane composition.

Selected reaction inhibitor of the Component 4 in this invention is the characteristic component of this invention. The thiophene compound when added in a small amount shows an excellent action on a shelf stability around room temperature without any damage to curability of a composition at an elevated temperature. The first selection of the Component 4 which is used for this invention is the thiophene compound. As the thiophene compound may be preferably employed those thiophene compounds represented by the following general formulae (1) and (2).

$$[T]_n \qquad (1)$$

wherein T represents a thiophene molecular skeleton and n represents an integer of 1–4. Specifically, there may be mentioned thiophene in a narrow sense and dithiophene, trithiophene and tetrathiophene wherein 2–4 unsubstituted thiophene skeletons are linearly linked.

$$Ar—T—Ar' \qquad (2)$$

wherein T represents a thiophene molecular skeleton, Ar represents an aryl group or an arylalkyl group, and Ar' represents an aryl group, an arylalkyl group or a hydrogen atom. In this case, the aryl group forming the aryl group or arylalkyl group may be exemplified by a phenyl group, a naphthyl group or a phenyl or naphthyl group having 1–3 alkyl groups, alkoxy groups, halogen atoms or hetero atom containing substituents. And, as examples of the arylalkyl group may be exemplified a benzyl group or a benzyl group, the phenyl group of which is the above-mentioned substituted phenyl group.

Specific examples of the thiophene compound may be thiophene derivatives such as thiophene, bithiophene, terthiophene, benzothiophene, 2-methyl-benzothiophene, 2-methoxy-benzothiophene, 2-bromo-benzothiophene, dibenzothiophene, 2,2'-methyl-benzothiophene or 2,2'-dibromo-dibenzothiophene.

The second selection of the Component (4) which may be used in this invention is the isocyanide compound. As the isoctanide compound may be preferably employed a compound represented by the following general formula (3).

$$R^1—NC \qquad (3)$$

wherein $R^1$ is a hydrocarbyl group of 1–18 carbon atoms which has optionally a substituent. As the hydrocarbyl group may be an alkyl group, a cycloalkyl group, an aryl group or an arylalkyl group.

As the alkyl group may be preferably a straight or branched alkyl group of 1–10 carbon atoms and a tertiary branched alkyl group is particularly preferred. As the cycloalkyl group may be preferably a cycloalkyl group having a 5–8 membered ring. The aryl group may be exemplified by a phenyl group or a naphthyl group and the arylalkyl group may be exemplified by a benzyl group. The aryl group constituting these groups may preferably have as a substituent an alkyl group, an alkoxy group, a halogen atom or a hetero ring-containing substituent.

As these isocyanide compounds may be used commercially available products and there may be preferably used those compounds synthesized according to the process as described in "Organic Functional Group Preparation" (issued from Academic Press, page 206). Specific examples of the compounds which may be used as the Compound (4) may be ethyl isocyanide, ispropyl cyanide, tert-butyl isocyanide, 1,1,3,3-tetramethylbutyl isocyanide, cyclohexyl isocyanide, benzyl isocyanide, 4-methylbenzyl isocyanide, 4-chlorobenzyl isocyanide, phenyl isocyanide, 4-butylphenyl isocyanide, 4-chlorophenyl isocyanide, 3-methoxyphenyl isocyanide, 4-methoxyphenyl isocyanide or 2,6-dimethylphenyl isocyanide.

The third selection of the Component (4) which may be used in this invention is a cyclic thioether compound or a cyclic azoether compound. As these compounds may be preferably used the compounds represented by the following formulae (4) and (5).

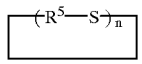 (4)

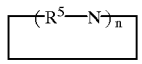 (5)

wherein $R^1$ is a divalent hydrocarbyl group of 3–18 and n is an integer of not less than 3. The hydrocarbyl group may be preferably an alkylene group and n is preferably 3–8, particularly preferably 4–6.

Specific examples of the cyclic thioether compounds may be 1,4,7,10-tetrathiacyclohexadecane (12-thiacrown-4), 1,4,7,10,13-pentathiacyclohexadecane (15-thiacrown-5), 1,4,7,10,13,16-hexathiacyclohexadecane (18-thiacrown-6) and the like, and substituted derivatives of said thiacrown ether compounds such as dibenzo-18-thiacrown-6, dinaphtho-12-thiacrown-4, dicyclohexyl-15-thiacrown-5 and the like.

Specific examples of the cyclic azoether compounds may be 1,4,7,10-tetraazacyclododecane (12-azacrown-4), 1,4,7,10,13-pentaazacyclopentadecane (15-azacrown-5), 1,4,7,10,13,16-hexaazacyclooctadecane (18-azacrown-6) and the like, and substituted derivatives thereof may be also included like said cyclic thioethers.

The fourth selection of the Component (4) which may be used in this invention is an imino compound. As the imino compound may be preferably used a compound represented by the following general formula (6).

$$R^2—N=C(R^3,R^4) \quad (6)$$

wherein $R^2$ is a hydrocarbyl group of 1–12 carbon atoms which may be optionally substituted. As the hydrocarbyl group may be alkyl group, a cycloalkyl group, an aryl group or an arylalkyl group. $R^3$ and $R^4$ individually in each occurrence is a hydrogen atom or a hydrocarbyl group of 1–12 carbon atoms which may be optionally substituted, and as the hydrocarbyl group may be alkyl group, a cycloalkyl group, an aryl group or an arylalkyl group.

Specific examples of the imino compounds may be shiff bases such as ethylideneaniline, benzylideneaniline, benzylidenebenzylaniline, benzylidenemethylaniline, benzylidenebutylaniline, α-methyl-benzylideneaniline, α-phenyl-benzylideneaniline and the like.

The fifth selection of the Component (4) which may be used in this invention is a polymer which has a plurality of functional groups capable of forming a complex with platinum atom and has an average molecular weight of 1,000–200,000. As the functional group may be a complex-forming organic functional group having a sulfur atom, a nitrogen atom or a phosphor atom as a functional group and examples thereof may be a sulfide group, a secondary or tertiary amino group, a phosphine group, as well as a thiophene group and an imino group.

As the sulfide group may be preferably used a group represented by the general formula (7).

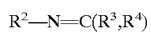 (7)

wherein $R^6$ is a divalent hydrocarbyl group of 1–8 carbon atoms, preferably an alkylene group or arylene group, and $R^7$ is a monovalent hydrocarbyl group of 1–8 carbon atoms, preferably an alkyl group, an aryl group or a cycloalkyl group.

As the secondary or tertiary amino group may be preferably used a group represented by the general formula (8).

$$—R^8—N(R^9,R^{10}) \quad (8)$$

wherein $R^8$ is a divalent hydrocarbyl group of 1–8 carbon atoms, preferably an alkylene group or arylene group, and $R^8$ and $R^{10}$ are a hydrogen atom or a hydrocarbyl group of 1–8 carbon atoms, preferably an alkyl group, an aryl group or a cycloalkyl group provided that both of $R^9$ and $R^{10}$ are not simultaneously hydrogen atoms.

As the phosphine group may be preferably used a group of the general formula (9).

$$—R^{11}—P(R^{12},R^{13}) \quad (9)$$

wherein $R^{11}$ is a divalent hydrocarbyl group of 1–8 carbon atoms, preferably an alkylene group or arylene group, and $R^{12}$ and $R^{13}$ are a hydrogen atom or a hydrocarbyl group of 1–8 carbon atoms, preferably an alkyl group, an aryl group or a cycloalkyl group.

These functional groups are usually introduced into the polymer as a side chain.

The thiophene group or imino group as the functional group in the polymer forming a main chain is the group in which one hydrogen atom bound to the carbon atom in said thiophene compound and imino compound forms a bond to the polymer molecule.

Such complex-forming functional group is usually introduced into the polymer molecule as a side chain thereof.

As the polymer which may constitute the main chain may be preferably a polymer which has reactive functional groups such as carboxyl groups (or functional derivatives thereof), hydroxy groups, halogen atoms and the like in repeating units thereof, and said fifth Component (4) may be easily prepared by reacting said functional groups with a compounds having the above-mentioned functional groups.

Examples of such polymers may include acrylic polymers having a monomer component of acrylic acid or methacrylic acid (or functional derivatives thereof), vinyl alcohol polymers having a monomer component of vinyl alcohol, styrene polymers having a styrene having a reactive functional group such as a halogen atom and the like at the p-position thereof, phenol resins and the like. These polymers may be either homopolymers or copolymers copolymerized with adequate comonomers. In order to control a balance of solubility in the silicon polymer or curing temperature, it is preferred to use the most adequate combination of monomers.

Alternatively, there may be prepared a polymer capable of coordinating with a platinum atom polymerizing a polymerizable monomer having a sulfide group or the like in the side chain such as an acryloyl or vinyl monomer alone or with other comonomers, or, as mentioned above, it may be feasible to react a reactive monomer containing functional groups such as a sulfide or the like with a polymer having a functional group capable of reacting with the reactive group. As an example of the latter case, there may be mentioned a process wherein a polymer having carboxyl groups such as polyacrylic acid or a polymer of acrylic acid with methyl acrylate with a sulfide compound having a functional group reactive with carboxyl groups such as a bromomethyl group, a secondary or tertiary amino compound or a phosphine compound. This reaction may readily proceed, for example, by using dimethyl sulfoxide and the like as a solvent and 1,8-diaza(5,4,0)bicycloundecene-7 and the like as a catalyst.

An amount of the Component (4) to be compounded is theoretically 2 univalents to a platinum atom. If too small, a sufficient reaction retarding effect would not be attained and, if too large, curing at an adequate temperature would become difficult. Usually, 1–5 equivalents may be used with 1–3 equivalents being more preferable per a platinum compound. Usually, the number of equivalents of the complex-forming functional group is calculated in the case of a polymer.

It is usually preferred that the complex-forming functional group comprises not less than 5% in the polymerization degree of the polymer (namely, not less than 5% of a total of repeating unit numbers).

The said Components (1)–(4) are compounded as essential components in this invention, but the order for compounding them is not particularly critical.

For instance, there may be adequately adopted a process wherein the Component (3) is previously compounded with the Component (4) to form a complex and then the complex is compounded with the Component (1) and (2) or process wherein the Components (1)–(4) are simultaneously compounded.

Any adequate Components other than the Components (1)–(4) may be further incorporated into the composition of this invention. Typical examples thereof is organic fillers. As the organic fillers, there may be exemplified aerosol silica, silica gel, precipitated silica, pulverized silica, diatomaceous earth, iron oxide, titanium oxide, calcium carbonate, magnesium carbonate, zinc carbonte, carbon black and the like. An amount of the filler to be added may be optional provided that it could not adversely affect the object of this invention. And further, the filler may be used in a dispersed or dissolved state in a suitable organic solvent.

The organopolysiloxane composition of this invention is excellent in a shelf stability around room temperature and may be rapidly cured by moderate heating. In view of this, by using the organopolysiloxane composition of this invention are feasible a reduction in working steps for the products using said composition, a reduction in manufacturing cost of products and a prolonged working time using the products, and energy-saving is also feasible because of an excellent curability at a relatively lower temperature. The organopolysiloxane composition of this invention may be applied for various uses not only as potting materials or coating materials in electric and electronic industries, but also as dipping materials, template-molding materials, sealing materials, adhesives and the like, which may provide a great utility.

Also, the composition of this invention may be used as the one solution type and has no trouble as encountered in the two solution type such as mixing an others. Even in the case of the two solution type, no curing occurs in a mixing chamber or a nozzle in an intermixing coater so that troubles such as washing and others may be saved.

This invention will be explained by way of the following examples. It is to be noted that these examples are not limiting the scope of this invention. In Examples and Comparative Examples, parts and % are expressed with parts by weight and % by weight unless otherwise indicated. Test items shown in Tables were determined according to the following procedurs.

Gelling rate: A resin sample (10 g) was weighed into a 30 ml sample bottle, heated in a thermostat at 90° C. for 5 minutes and then the cured product thus obtained was washed with toluene while heating and the rate was calculated from a reduced weight after drying, provided that, where an imino compound and a polymer were used as a reaction retarder, determination was effected at 120° C. instead of the 90° C. as applied above.

Curing initiation temperature: A resin sample (0.1 g) was weighed and heated using DSC (under nitrogen atmosphere, heating rate of 10 ° C./minute). A temperature at which peak was initiated in the chart obtained at that time was defined as a convenient curing initiation temperature.

Shelf stability: A resin sample (10 g) was weighed into a 30 ml sample bottle, heated in a thermostat at 50° C. and the time required for gelation was observed; provided that, where a polymer was used as a reaction retarder, determination was effected at 40° C. instead of the 50° C. as applied above.

Photocuring property: A resin sample (10 g) was weighed into a 30 ml sample bottle, exposed to light irradiation with an irradaiation energy of 2000 mJ(milijoule) using an ultraviolet irradiation apparatus of a horizontal irradiation type and then the cured product thus obtained was washed with toluene while heating and the photocuring was calculated from a reduced weight after drying.

EXAMPLES 1–5

100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. Subsequently, to Speier's platinum catalyst containing 2.0% platinum was added 2 equivalents of the thiophene compound as shown in Table 1 to prepare a platinum-thiophene complex. To the base resin previously prepared was added the platinum catalyst at 30 ppm to afford the desired resin composition.

COMPARATIVE EXAMPLES 1–4

Platinum complexes were prepared by adding Speier's catalyst at 30 ppm to the well-known compound shown as a reaction inhibitor in Table 1 at 100 equivalents per platinum atom (Comparative Examples 1 and 2) or at 10 equivalents per platinum atom (Comparative Example 3) and added to the base resin obtained by Example 1 in the same manner as in Example 1. The results are shown in Table 1.

TABLE 1

| | Reaction inhibitor | Gelling rate (%) | Curing initiation temp. (° C.) | Shelf stability (h) |
|---|---|---|---|---|
| Ex. 1 | Thiophene | 80.0 | 70.2 | 24 |
| Ex. 2 | Bithiophene | 73.0 | 70.6 | 168 |
| Ex. 3 | Benzothiophene | 100.0 | 70.5 | 12 |
| Ex. 4 | Dibenzothiophene | 64.0 | 74.4 | 72 |
| Ex. 5 | Dibromo benzothiophene | 89.7 | 70.0 | 8 |
| Comp. Ex. 1 | 3-Methyl-1-buten-3-ol | 100.0 | 45.4 | 1 |
| Comp. Ex. 2 | Tetramethyl-ethylenediamine | 100.0 | 55.9 | 1 |
| Comp. Ex. 3 | Phenyl-isothiocyanate | 9.8 | 110.0 | 240 |
| Comp. Ex. 4 | Diphenyl sulfide | 100.0 | 50.0 | 1 |

EXAMPLES 6–11

100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin.

A platinum catalyst was prepared according to the following procedure: To two-necked flask equipped with a dropping funnel containing about 0.16 g (ca. 0.02 mole) of tert-butyl isocyanide were added about 0.42 g (ca. 0.01 mole) of potassium chloroplatinate and 1 molar % tetrabutylammonium chloride, the reaction system was thoroughly filled with nitrogen gas and then the content was dissolved in 5 ml of pure water. After confirming the dissolution of the reaction substrate in the reaction system, the isocyanide compound placed in the dropping funnel was slowly added dropwise at room temperature. Thereafter, the mixture was vigorously stirred for one hour while keeping room temperature to proceed the reaction. After completion of the reaction, the reaction mixture was washed twice with 50 ml of pure water and the complex thus prepared was separated by filtration. The complex thus filtered off was dried at room temperature under vacuum overnight and then recrystallized twice from ethanol.

Yield: 57.4%, m.p. 220° C. (with decomp.), IR (KBr,cm$^{-1}$): 2229, 635, 1460 (all showing characteristic absorptions of NC)

In the same manner as described above, a platinum complex was prepared using cyclohexyl isocyanide as the isocyanide compound.

Yield: 60.0%, m.p. 220° C. (with decomp.), IR (KBr,cm$^{-1}$): 2268, 637, 1452 (all showing characteristic absorptions of NC)

In the same manner as described above, a platinum complex was prepared using phenyl isocyanide as the isocyanide compound.

Yield: 40.0%, m.p. 250° C. (with decomp.), IR (KBr,cm$^{-1}$): 2276, 637, 1450 (all showing characteristic absorptions of NC)

Platinum complexes using the isocyanide compounds shown in Table 2 and prepared in the same manner as described above were added to the base resin as described above. The results are shown in Table 2.

EXAMPLES 12–17

TABLE 2

| Reaction inhibitor | | Gelling rate (%) | Curing initiation temp. (° C.) | Shelf stability (h) | Photo-curing property (%) |
|---|---|---|---|---|---|
| Ex. 6 | t-Butyl isocyanide | 80.5 | 83.2 | 168 | 100.0 |
| Ex. 7 | Cyclohexyl isocyanide | 100.0 | 77.4 | 96 | 100.0 |
| Ex. 8 | Phenyl isocyanide | 100.0 | 82.1 | 72 | 45.0 |
| Ex. 9 | Benzyl isocyanide | 50.5 | 74.8 | 48 | 55.0 |
| Ex. 10 | 4-Chloro-phenyl isocyanide | 100.0 | 81.3 | 24 | 65.3 |
| Ex. 11 | 4-Methoxy-phenyl isocyanide | 95.5 | 85.6 | 96 | 74.6 |
| Comp. Ex. 1 | 3-Methyl-1-buten-3-ol | 100.0 | 45.4 | 1 | 0 |
| Comp. Ex. 2 | Tetramethyl-ethylenediamine | 100.0 | 55.9 | 1 | 0 |

TABLE 2-continued

| Reaction inhibitor | | Gelling rate (%) | Curing initiation temp. (° C.) | Shelf stability (h) | Photo-curing property (%) |
|---|---|---|---|---|---|
| Comp. Ex. 3 | Phenyl isothiocyanate | 9.8 | 110.0 | 240 | 0 |

100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added an isopropanol solution of chloroplatinic acid.hexahydrate containing 2.0% platinum at 15 ppm and immediately 2 equivalents of the imino compound shown in Table 3 were added and stirred well to afford the desired resin composition.

COMPARATIVE EXAMPLES 5–7

To the base resin prepared as described in Example 12 was added the cyclic compound shown in Table 3 in the same manner.

TABLE 3

| Reaction inhibitor | | Gelling rate (%) | Curing initiation temp. (° C.) | Shelf stability (h) |
|---|---|---|---|---|
| Ex. 12 | 12-Thiacrown-4 | 100.0 | 101.8 | 240 |
| Ex. 13 | 15-Thiacrown-5 | 69.0 | 108.1 | 240 |
| Ex. 14 | 18-Thiacrown-6 | 85.5 | 105.6 | 240 |
| Ex. 15 | 12-Azacrown-4 | 100.0 | 110.0 | 336 |
| Ex. 16 | 15-Azacrown-5 | 100.0 | 109.0 | 336 |
| Ex. 17 | 18-Azacrown-6 | 100.0 | 99.5 | 336 |
| Comp. Ex. 5 | β-Cyclodextrin | 11.0 | 142.7 | 50 |
| Comp. Ex. 6 | 12-Crown-4 | 90.5 | 70.6 | 50 |
| Comp. Ex. 7 | 15-Crown-5 | 100.0 | 75.2 | 50 |

EXAMPLES 18–23

100 parts of dimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. Then, to an isopropanol solution of chloroplatinic acid-hexahydrate containing 2.0% platinum was added the imino compound shown in Table 4 to prepare a platinum-imino complex. Amounts of the imine Compounds to be blended were 2 equivalents in Example 18 and Comparative Example 5, 1 equivalent in Example 19, 3 equivalents in Example 20 and Comparative Example 6 and 4, equivalent in Example 21, respectively, to platinum atom. Thereafter, to the base resin previously prepared was added the platinum complex at 30 ppm to afford the desired resin compositions.

COMPARATIVE EXAMPLES 8–12

To the base resin prepared as described in Example 1 were added an isopropanol solution of chloroplatinic acid.hexahydrate containing 2.0% platinum and as a reaction inhibitor 100 equivalents of 3-methyl-1-butyn-3-ol (Comparative Example 8), 100 equivalents of tetramethylethylenediamine (Comparative Example 9), 10 equivalents of phenylisothiocyanate (Comparative Example 10), 5 equivalents of H$_3$C—N=Ch—Ph (Comparative Example 11), and 6 equivalents of Ph—N=CH—Ph (Comparative Example 12), respectively, to platinum atom to afford platinum complexes. Each of these platinum complexes was added to the said base resin at 30 ppm. The results are shown in Table 4.

TABLE 4

|  | Reaction inhibitor | Gelling rate (%) | Curing initiation temp. (° C.) | Shelf stability (h) |
|---|---|---|---|---|
| Ex. 18 | Ph—N=CH—Ph | 95.5 | 115.5 | 120 |
| Ex. 19 | Ph—CH$_2$—N=CH—Ph | 50.0 | 128.8 | 270 |
| Ex. 20 | H$_3$C—N=CH—Ph | 80.5 | 137.0 | 270 |
| Ex. 21 | H$_9$C$_4$—N=CH—Ph | 85.8 | 137.8 | 150 |
| Ex. 22 | Ph—N=C(CH$_3$) (Ph) | 100.0 | 119.4 | 120 |
| Ex. 23 | Ph—N=C(Ph) (Ph) | 95.5 | 110.0 | 148 |
| Comp. Ex. 8 | 3-methyl-1-buten-3-ol | 100.0 | 45.4 | 1 |
| Comp. Ex. 9 | Tetramethylethylenediamine | 100.0 | 55.9 | 1 |
| Comp. Ex. 10 | Phenylisothiocyanate | 18.3 | 110.0 | 240 |
| Comp. Ex. 11 | H$_3$C—N=CH—Ph | 48.3 | 135.0 | 360 |
| Comp. Ex. 12 | Ph—N=CH—Ph | 34.9 | 138.0 | 360 |

EXAMPLES 24–34

EXAMPLE 24

In 5 ml of dimethylformamide was added polymethacrylic acid with a number-average molecular weight of about 10000 (0.86 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer having sulfide groups (recovery rate of 90%) (introduction rate of sulfide groups of 98% to an amount of the carboxylic acid of the polymer)(calculated from an integrated rate of the methine protons in the polymer side chain and an integrated rate of the methyl group protons in the polymer main chain according to 1HNMR). The resulting polymer ligand was dissolved in tetrahydrofuran, 2 equivalents of chloroplatinic acid to the sulfide group contained in the polymer was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 25

In 5 ml of dimethylformamide was added poly(p-chlorostyrene) with a number-average molecular weight of about 50000 (1.52 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer ligand having sulfide groups (recovery rate of 78%) (introduction rate of sulfide groups of 98%: determined in the same manner as described in Example 1, which will be similarly applied hereinafer). The resulting polymer ligand was dissolved in tetrahydrofuran, 3 equivalents of chloroplatinic acid to the sulfide group was added and the mixture was heated at 40° C. for 3 hours to prepare the desired platinum complex. On the other hand, 100 parts of dimethylpolysiloxane having a molecular weight of about 50000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 26

In 5 ml of dimethylformamide was added a phenol resin with a number-average molecular weight of about 100000 (1.00 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer ligand having sulfide groups (recovery rate of 90%, introduction rate of sulfide groups of 81%). The resulting polymer ligand was dissolved in tetrahydrofuran, 4 equivalents of chloroplatinic acid to the sulfide group was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 27

In dimethylformamide was dissolved a polymethacrylic acid with a number-average molecular weight of about 2000 and to the solution were added 2-bromomethylthiophene and diazabicyclo-(5,4,0)-undecene-7 and the resulting mixture was heated at 50° C. for 24 hours. After completion of the heating, the reaction solution was poured into a large volume of methanol to recover the polymer ligand having sulfide groups (yield 99%, reaction rate 98% as confirmed by 1HNMR). The resulting polymer ligand was dissolved in tetrahydrofuran, 2 equivalents of chloroplatinic acid to the thiophene group in the polymer side chain was added and the mixture was heated at 40° C. for 3 hours to prepare the desired platinum complex. On the other hand, 100 parts of polydimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 28

N,N'-dimethylaminoethyl methacrylate as a monomer was polymelized at 60° C. for 3 hours using ethanol as a reaction solvent and azobisiso-butyronitrile as a polymerization initiator. After completion of the polymerization, the reaction solution was poured into a large volume of diethyl ether to recover the polymer ligand having dimethylamino groups in the corresponding side chain. Then, resulting polymer ligand was dissolved in tetrahydrofuran, an equivalent of chloroplatinic acid to the dimethylamino group in the polymer chain was added and the mixture was heated at 40° C. for 3 hours to prepare the desired platinum complex. On the other hand, 100 parts of polydimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 29 p-formylstyrene as a monomer was polymelized at 60° C. for 8 hours using chlorobenzene as a reaction solvent and azobisiso-butyronitrile as a polymerization initiator. After completion of the polymerization, the reaction solution was poured into a large volume of methanol to recover the polymer having formyl groups in the side chains (a number-average molecular weight of about 9000). Then, the resulting polymer ligand was dissolved in dimethylformamide, two equivalents of aniline to the formyl group in the polymer side chain was added and the mixture was heated at 50° C. for 24 hours. After completion of the heating, the reaction solution was poured into a large volume of methanol to recover the polymer ligand having the imine group in the corresponding side chain (yield 90%, reaction rate 88% as confirmed by 1HNMR). Then the resulting polymer ligand was dissolved in tetrahydrofuran, an equivalent of chloroplatinic acid to the imino group in the polymer side chain was added and the mixture was heated at 40° C. for 3 hours to prepare the desired platinum complex. On the other hand, 100 parts of polydimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 30

In dimethylformamide was dissolved a polymethacrylic acid with a number-average molecular weight of about 10000 and to the solution were added 2-bromomethyl isocyanide and diazabicyclo-(5,4,0)-undecene-7 and the resulting mixture was heated at 50° C. for 24 hours. After completion of the heating, the reaction solution was poured into a large volume of methanol to recover the corresponding polymer ligand (yield 67%, reaction rate 91% as confirmed by 1HNMR). The resulting polymer ligand was dissolved in tetrahydrofuran, an equivalent of chloroplatinic acid to the isocyanide group in the polymer side chain was added and the mixture was heated at 40° C. for 3 hours to prepare the desired platinum complex. On the other hand, 100 parts of polydimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 31

In dimethylformamide was dissolved a polymethacrylic acid with a number-average molecular weight of about 10000 and to the solution were added 4-bromomethyl-phenyl-dimethylphosphine and diazabicyclo-(5,4,0)-undecene-7 and the resulting mixture was heated at 50° C. for 24 hours. After completion of the heating, the reaction solution was poured into a large volume of methanol to recover the corresponding polymer ligand (yield 67%, reaction rate 91% as confirmed by 1HNMR). The resulting polymer ligand was dissolved in tetrahydrofuran, an equivalent of chloroplatinic acid to the phenyl-dimethylphosphine group in the polymer side chain was added and the mixture was heated at 40° C. for 3 hours to prepare the desired platinum complex. On the other hand, 100 parts of polydimethylpolysiloxane having a molecular weight of about 60000 and a molecular chain, both ends of which were hindered with dimethylvinylsilyl groups, and 1 part of polydimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 32

In 5 ml of dimethylformamide was added a copolymer of methacrylic acid with methyl methacrylate with a number-average molecular weight of about 14000 (composition rate of 4:6, 0.95 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the corresponding polymer ligand (recovery rate of 99%), introduction rate of 94% (an introduction rate of 38% to 40% of a carboxylic acid functional group so that a introduction rate of the ligand was 28% from a total of the polymer): calculated from an integrated rate of the methine protons in the polymer side chain and an integrated rate of the methyl group protons in the polymer main chain according to 1HNMR). The resulting polymer ligand was dissolved in tetrahydrofuran, an equivalent of chloroplatinic acid to the thiophene group in the polymer was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

EXAMPLE 34

In 5 ml of dimethylformamide was added a copolymer of poly-(methacrylic acid-methyl methacrylate) with a number-average molecular weight of about 14000 (composition rate of 2:8, 0.95 g, 10 mmol) and to the solution were added 2-bromomethylphenyl-dimethyl-phosphine (2.34 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer ligand having phosphine groups (recovery rate of 67%, introduction rate of the phosphine ligand of 94% to the carboxylic acid of the polymer which is introduction rate of 19% to a total of the polymer). The resulting polymer ligand was dissolved in tetrahydrofuran, two equivalents of chloroplatinic acid to the dimethylphosphine group in the polymer was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

COMPARATIVE EXAMPLES 13–16

COMPARATIVE EXAMPLE 13

In 5 ml of dimethylformamide was added a polymethacrylic acid oligomer with a number-average molecular weight of about 800 (0.86 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer having sulfide groups (recovery rate of 95%, introduction rate of sulfide group of 90%). The resulting polymer was dissolved in tetrahydrofuran, an equivalent of chloroplatinic acid to the sulfide group was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

COMPARATIVE EXAMPLE 14

In 5 ml of dimethylformamide was added a polymethacrylic acid oligomer with a number-average molecular weight of about 800 (0.86 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer having sulfide groups (recovery rate of 90%, introduction rate of sulfide groups of 98%). The resulting polymer was dissolved in tetrahydrofuran, an equivalent of chloroplatinic acid to the sulfide group was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

COMPARATIVE EXAMPLE 15

In 5 ml of dimethylformamide was added a polymethacrylic acid with a number-average molecular weight of about 10000 (0.86 g, 10 mmol). A diluted solution of propargyl alcohol with tetrahydrofuran was cooled to 0° C. and the resulting solution was slowly added dropwide a 6N hexane solution of n-butyl lithium to prepare lithium salt of propargyl alcohol. This solution was allowed ro raise to room temperature and was added to the polychloromethylstyrene prepared above and the resulting mixture was heated at 80° C. for 12 hours. After completion of the heating, the reaction solution was poured into a large volume of methanol to recover the polymer having propargyl groups (recovery rate of 90%, introduction rate of sulfide groups of 98%). The resulting polymer was dissolved in tetrahydrofuran, an equivalent of chloroplatinic acid to the propargyl group was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition.

COMPARATIVE EXAMPLE 16

In 5 ml of dimethylformamide was added a poly (methacrylic acid-methyl methacrylate) copolymer with a number-average molecular weight of about 11000 (a composition rate of 0.2:9.8, 0.98 g, 10 mmol) and to the solution were added 2-bromomethylphenyl sulfide (2.22 g, 11 mmol) and diazabicyclo-(5,4,0)-undecene-7 (1.67 g, 11 mmol) and the resulting mixture was heated at 50° C. for 24 hours. After completion of the heating, the reaction solution was poured into a large volume of methanol to recover the polymer having sulfide groups (recovery rate of 97%, introduction rate of the ligand of 98%, introduction rate of 1.9% to 2% carboxylic acid functional group): calculated from an integrated rate of the methine protons in the polymer chain and an integrated rate of the methyl protons in the polymer main chain by 1HNMR). The resulting polymer was dissolved in tetrahydrofuran, an equivalent of chloroplatinic acid to the sulfide group was added and the mixture was heated at 40° C. for 3 hours to prepare the desired platinum complex. On the other hand, 100 parts of dimethylpolysiloxane having a molecular weight of about 60000 and a molecular chain, both ends of which were hindered with dimethylvinylsilyl groups, and 1 part of dimethylpolysiloxane having a molecular weight of about 2000 and a molecular chain, both ends of which were hindered with dimethylhydrogensilyl groups, were thoroughly stirred to prepare a base resin. To this base resin was added the platinum complex previously prepared at 30 ppm to afford the desired resin composition. The above results are shown in

TABLE 5

|  | Gelling rate (%) | Curing initiation temp. (° C.) | Shelf stability (h) |
| --- | --- | --- | --- |
| Ex. 24 | 100.0 | 100.0 | 150 |
| Ex. 25 | 100.0 | 121.0 | 100 |
| Ex. 26 | 80.0 | 135.0 | 210 |
| Ex. 27 | 100.0 | 112.0 | 200 |
| Ex. 28 | 99.0 | 110.0 | 140 |
| Ex. 29 | 86.5 | 120.0 | 110 |
| Ex. 30 | 82.2 | 90.0 | 150 |
| Ex. 31 | 84.0 | 137.0 | 220 |
| Ex. 32 | 100.0 | 88.7 | 150 |
| Ex. 33 | 95.5 | 105.0 | 110 |
| Ex. 34 | 42.2 | 137.0 | 220 |
| Comp. Ex. 13 | 8.5 | 144.7 | 360 |
| Comp. Ex. 14 | 100.0 | 88.0 | 12 |
| Comp. Ex. 15 | 100.0 | 85.5 | 12 |
| Comp. Ex. 16 | 100.0 | 68.5 | 24 |

What is claimed is:

1. An addition-curing organopolysiloxane composition comprising an organopolysiloxane containing an alkenyl group, an organo hydrogenpolysiloxane, a platinum catalyst and a reaction inhibitor, characterized in that said reaction inhibitor is at least one member selected from the group consisting of a thiophene compound, an isocyanide compound, a cyclic thioether compound represented by the general formula

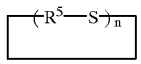

wherein $R^5$ is a divalent hydrocarbyl group of 3–18 carbon atoms and n is an interger of 3–8, a cyclic azoether compound, an imino compound and a polymer selected from the group consisting of acrylic polymers, vinyl polymers, styrene polymers and phenol resins wherein the polymer comprises a plurality of functional groups capable of forming a complex with a platinum atom, the functional groups being selected from the group consisting of sulfide groups, secondary amino groups, tertiary amino groups, phosphine groups, thiophene groups and imino groups.

2. The composition as claimed in claim 1 wherein said thiophene compound is represented by the general formula

wherein T is a thiophene molecular skeleton, n represents an integer of 1–4, Ar is an aryl group or an arylalkyl group, and Ar' is an aryl group, an arylalkyl group or a hydrogen atom.

3. The composition as claimed in claim 1 wherein said isocyanide compound is represented by the general formula

wherein $R^1$ is a hydrocarbyl group of 1–18 carbon atoms.

4. The composition as claimed in claim 1 wherein said imino compound is represented by the general formula

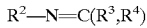

wherein $R^2$ is an unsubstituted or substituted hydrocarbyl group of 1–12 carbon atoms, $R^3$ and $R^4$ individually are a hydrogen atom or an unsubstituted or substituted hydrocarbyl group of 1–12 carbon atoms.

5. The composition as claimed in claim 1 wherein an amount of said reaction inhibitor is 1–5 equivalents per platinum atom.

* * * * *